United States Patent Office 3,317,389
Patented May 2, 1967

3,317,389
ANTIBACTERIAL COMPOSITION CONTAINING AMPICILLIN OR HETACILLIN WITH DICLOXACILLIN
Alphonse P. Granatek, Baldwinsville, and Peter A. Ratto, Syracuse, N.Y., assignors to Bristol-Myers Company, New York, N.Y., a corporation of Delaware
No Drawing. Filed Mar. 17, 1965, Ser. No. 440,622
12 Claims. (Cl. 167—65)

This invention relates to antibacterial compositions possessing both low toxicity and a broad spectrum of antibacterial activity and, more particularly, to mixtures of one part of dicloxacillin or salt thereof with from about one to about two parts of ampicillin or of hetacillin.

Dicloxacillin is a common name for 3-(2',6'-dichlorophenyl)-5-methyl-4-isoxazolylpenicillin. As used herein, the term dicloxacillin includes the free acid form and the nontoxic, pharmaceutically acceptable cationic salts of that penicillin. The preparation and properties have been described, inter alia, in U.S. Patent 2,996,501 and South African patent specification 63/4323. Although well absorbed orally, dicloxacillin suffers from the disadvantage of being ineffective against Gram-negative organisms, as illustrated below.

Ampicillin is the generic name for D-(-)-α-aminobenzylpenicillin. As used herein, the term ampicillin includes the free acid, (i.e., amphoteric) form, the anionic salts with acids such as hydrochloric acid, the cationic salts with bases such as sodium hydroxide and the hydrates of that penicillin. Their preparation and properties have been described, inter alia, in U.S. Patents 2,985,648, 3,140,282, 3,144,445 and 3,157,640 and in an application of our colleagues Herbert H. Silvestri and David A. Johnson filed October 29, 1962 as U.S.S.N. 233,943 and issued April 27, 1965 as U.S. Patent 3,180,862. Ampicillin suffers from the disadvantage of being very susceptible to inactivation by Staphylococcus penicillinase as illustrated below and thus being ineffective in the treatment of bacterial infections in which such staphylococci are present.

Hetacillin is the generic name for 6-(2,2-dimethyl-5-oxo-4-phenyl-1-imidazolidinyl)penicillanic acid which has the structure

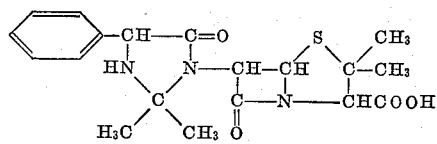

As used herein, the term hetacillin includes the "free acid" illustrated above and its nontoxic, pharmaceutically acceptable cationic salts of the acidic carboxylic acid group and its nontoxic, pharmaceutically acceptable acid addition anionic salts, (i.e., salts of the basic nitrogen).

Their preparation and properties are described in Belgian Patent 642,851 and in an application of our colleagues David A. Johnson and Charles A. Panetta filed Jan. 6, 1965, as U.S.S.N. 423,677 and issued Aug. 3, 1965, as U.S. Patent 3,198,804. Hetacillin suffers from the disadvantage of being very susceptible to inactivation by staphylococcal penicillinase, as illustrated below.

It was the object of the present invention to provide an improved, nontoxic antibacterial composition which was effective against both Gram-negative and Gram-positive bacteria including especially staphylococcal producers of penicillinase. It was a further object of the present invention to discover a method of preserving the antibacterial activity of ampicillin and hetacillin against Gram-negative organisms which are accompanied by penicillinase-producing Staphylococci.

The objects of the present invention were attained by the provision according to the present invention, of a penicillinase-resistant antibacterial composition having a broad spectrum of activity which comprises a mixture of one part by weight of dicloxacillin and about one to about two parts by weight of ampicillin or hetacillin.

A particular embodiment of the present invention is a therapeutic composition in unit dosage form comprising a mixture of about 125 to 250 mgm. per unit dose of dicloxacillin with about 250 mgm. per unit dose of a member selected from the group consisting of ampicillin and hetacillin.

There is included within the present invention the method of inhibiting the growth of bacteria which comprises applying to the habitat of the bacteria an effective amount of an antibacterial composition comprising a mixture of about one to about two parts by weight of a member selected from the group consisting of hetacillin and ampicillin with one part by weight of dicloxacillin.

Another preferred embodiment of the present invention is the process for treating a bacterial disease in animals which comprises administering to the bacterial host a therapeutic amount of an antibacterial composition comprising a mixture of about one to about two parts by weight of a member selected from the group consisting of hetacillin and ampicillin with one part by weight of dicloxacillin.

As shown in Table 1 below it was found that the mixtures of dicloxacillin and hetacillin of the present invention did exhibit such a broadened spectrum over that of their individual components and in addition, most surprisingly, it was found that the mixtures acted synergistically against the Shigellae and against certain Aerobacter (see Table 2).

In Table 2 below are shown the M.I.C.'s of these single compounds and the mixtures of the present invention against several clinically isolated Gram-negative bacteria and some penicillin-resistant Staphylococci. The mixtures of the present invention again exhibit both a broad spectrum and synergistic activity against Aerobacter and Shigella.

TABLE I

| Organism | Minimum Inhibitory Concentrations (M.I.C.) in mcg./ml. | | | | |
|---|---|---|---|---|---|
| | Hetacillin | Dicloxacillin | Mixtures (parts by weight)—Dicloxacillin (1) and Hetacillin (1 or 2) | | Ampicillin |
| | | | 1:1 | 1:2 | |
| Bacillus anthracis | 0.03 | 0.3 | 0.03 | 0.03 | 0.03 |
| Bacillus circulans ATCC No. 9961 | 8.0 | 32 | 8.0 | 8.0 | 8.0 |
| Bacillus cereus (Yale) | 0.03 | 0.06 | 0.03 | 0.03 | 0.03 |
| Bacillus mycoides "O" | 10 | >1.0 | >1.0 | >1.0 | 10 |
| Bacillus subtilis ATCC No. 6633 | 0.03 | 0.08 | 0.03 | 0.03 | 0.03 |
| Corynebacterium xerosis | 0.015 | 0.15 | 0.03 | 0.03 | 0.03 |
| Diplococcus pneumoniae [1] | 0.03 | 0.5 | 0.06 | 0.06 | 0.06 |
| Gaffkia tetragena | 0.06 | 0.15 | 0.06 | 0.06 | 0.06 |
| Neisseria catarrhalis ATCC No. 8176 | 0.003 | 2.0 | 0.003 | 0.005 | 0.003 |
| Sarcina lutea ATCC No. 10054 | 0.004 | 0.08 | 0.004 | 0.008 | 0.004 |
| Shigella sonnei | 1.3 | 4 | 0.3 | 0.15 | 2.5 |
| Staphylococcus aureus 209P | 0.13 | 0.25 | 0.13 | 0.13 | 0.13 |
| Staphylococcus aureus Smith | 0.06 | 0.15 | 0.08 | 0.08 | 0.13 |
| Staphylococcus aureus BX-1633-2 | 16 | 0.15 | 0.6 | 0.6 | 16 |
| Staphylococcus aureus 52-75 | 16 | 0.15 | 0.6 | 0.6 | 63 |
| Streptococcus pyogenes digonnet No. 7 | 0.015 | 0.08 | 0.03 | 0.015 | 0.03 |
| Streptococcus agalactiae ATCC No. 7077 | 0.03 | 0.13 | 0.03 | 0.015 | 0.015 |
| Vibrio comma | 1.3 | 125 | 2.5 | 2.5 | 1.3 |
| Proteus morganii | >250 | >250 | 63 | 63 | >250 |
| Aerobacter aerogenes (Yale) | 62 | >250 | 250 | 125 | 125 |
| Alcaligenes faecalis ATCC No. 8750 | 5 | >250 | 10 | 10 | 5 |
| Brucella bronchiseptica | 32 | >250 | 32 | 63 | 32 |
| Escherichia coli ATCC No. 8739 | 6.0 | >250 | 16 | 16 | 13 |
| Escherichia coli K12 | 4.0 | >250 | 4.0 | 4.0 | 8.0 |
| Escherichia coli PO1495 | 8.0 | >250 | 4.0 | 4.0 | 8.0 |
| Proteus mirabilis ATCC No. 9921 | 2.5 | >250 | 10 | 5.0 | 5.0 |
| Proteus rettgerii ATCC No. 9250 | 0.15 | 125 | 0.6 | 0.3 | 0.3 |
| Proteus vugaris ATCC No. 9920 | 0.6 | >250 | 1.3 | 1.3 | 0.6 |
| Salmonella enteritidis | 0.15 | 125 | 0.6 | 0.6 | 0.3 |
| Salmonella paratyphi A | 0.15 | 125 | 0.3 | 0.6 | 0.15 |
| Salmonella paratyphi B | 0.8 | >250 | 0.8 | 1.5 | 0.8 |
| Salmonella schottmuelleri | 0.3 | 250 | 0.6 | 0.6 | 0.3 |
| Salmonella typhosa | 2.5 | >250 | 3.0 | 1.5 | 2.5 |
| Serratia marcescens | 32 | >250 | 32 | 125 | 32 |
| Shigella dysenteriae | 0.6 | 125 | 0.3 | 0.6 | 0.6 |
| Shigella paradysenteriae | 2.5 | 125 | 0.6 | 1.3 | 2.5 |
| Streptococcus faecalis ATCC No. 8022 | 2.5 | >250 | 5.0 | 5.0 | 2.5 |

[1] Tested in heart infusion broth (HIB) with 5% pooled human serum added. All others were tested in HIB alone.

TABLE 2

| Organism | Minimum Inhibitory Concentrations (M.I.C.) in mcg./ml. | | | | |
|---|---|---|---|---|---|
| | Hetacillin | Dicloxacillin | Mixtures (parts by weight)—Dicloxacillin (1) and Hetacillin (1 or 2) | | Ampicillin |
| | | | 1:1 | 1:2 | |
| Aerobacter cloacae CDC No. 4018 [1] | >250 | >250 | 63 | 63 | >250 |
| Aerobacter cloacae CDC No. 2252 | >250 | >250 | 63 | 63 | 250 |
| Aerobacter cloacae CDC No. 2316 | >250 | >250 | 125 | 125 | 125 |
| Shigella flexneri CDC No. 6533 | 250 | 250 | 32 | 16 | 250 |
| Staphylococcus aureus M1732 | 50 | 0.5 | 1.6 | 3.1 | 50 |
| Staphylococcus aureus M1845 | 100 | 5.0 | 13 | 6.3 | 100 |
| Staphylococcus aureus M1766 | >200 | 0.31 | 0.63 | 1.3 | >200 |

[1] All organisms were tested in heart infusion broth.

As shown in Table 3 below it was found that the mixtures of dicloxacillin and ampicillin did exhibit such a broadened spectrum and indicated synergism in the case of *Shigella sonnei*, *Shigella flexneri* and *Proteus morganii*. Mouse protection tests were also run, using intraperitoneal challenge and a single intramuscular administration of the drug at the time of challenge. Median curative doses ($CD_{50}$) in mgm./kg. are presented in Table 4. The *Staph. aureus* Smith and *S. aureus* 1633 figures are the average of two runs.

TABLE 3

| Organism | Medium [1] | Minimum Inhibitory Concentrations (M.I.C.) in mcg./ml. | | | |
|---|---|---|---|---|---|
| | | Ampicillin | Dicloxacillin | Mixtures (parts by weight)—Dicloxacillin (1) and Ampicillin (1 or 2) | |
| | | | | 1:1 | 1:2 |
| Diplococcus pneumoniae M1637 | HIB [2] | 0.3 | 0.3 | 0.06 | 0.06 |
| Streptococcus pyogenes Digonnet | HIB | 0.025 | 0.06 | 0.03 | 0.03 |
| Streptococcus pyogenes M2629 | HIB | 0.016 | 0.06 | 0.03 | 0.03 |
| Streptococcus pyogenes M2630 | HIB | 0.03 | 0.06 | 0.06 | 0.03 |
| Streptococcus pyogenes M2634 | HIB | 0.016 | 0.008 | 0.03 | 0.03 |
| Staphylococcus aureus Smith | HIB | 0.125 | 0.062 | 0.12 | 0.125 |
| Staphylococcus aureus Smith | HIB [3] | 0.125 | 2.5 | 0.25 | 0.125 |
| Staphylococcus aureus BX-1633-2 | HIB | 31 | 0.3 | 0.6 | 1.2 |
| Staphylococcus aureus 52-75 | HIB | 31 | 0.3 | 0.6 | 1.2 |
| Staphylococcus aureus M-2 | HIB | 8 | 0.3 | 0.6 | 0.6 |
| Staphylococcus aureus M-31 | HIB | 8 | 0.16 | 0.6 | 0.6 |
| Staphylococcus aureus M-45 | HIB | 8 | 0.3 | 0.6 | 1.2 |
| Shigella sonnei | HIB | 2.5 | 6.2 | 0.3 | 0.63 |
| Bacillus anthracis Yale | HIB | 0.03 | 0.3 | 0.03 | 0.03 |
| Vibrio comma | HIB | 0.6 | 25 | 0.6 | 0.6 |
| Bacillus cereus No. 569 | HIB | 31 | 125 | 31 | 31 |
| Streptococcus faecalis ATTC No. 8022 | HIB | 2.5 | 1,000 | 5.0 | 2.5 |
| Proteus morganii ATCC No. 8019 | HIB | 1,000 | 2,000 | 63 | 63 |
| Proteus mirabilis ATCC No. 9921 | HIB | 5 | 2,000 | 10 | 5 |
| Klebsiella pneumoniae (Yale) | HIB | 1.6 | 500 | 3.1 | 3.1 |
| Salmonella enteritidis | HIB | 0.31 | 152 | 0.6 | 0.3 |
| Salmonella typhosa (Yale) | HIB | 2.5 | 500 | 3.1 | 3.1 |
| Shigella dysenteriae | HIB | 0.63 | 125 | 0.6 | 0.3 |
| Shigella flexneri CDC No. 6533 | HIB | 250 | 250 | 16 | 31 |

[1] HIB—Heart Infusion Broth.
[2] 5% Pooled human serum added.
[3] 50% Pooled human serum added.

TABLE 4
[CD$_{50}$ in mgm./kg. of ampicillin, dicloxacillin and its mixtures against different infections]

| Drug | S. aureus Smith | S. aureus 1633 | Salmonella enteritidis | Proteus sp. No. 329 | Klebsiella pneumoniae |
|---|---|---|---|---|---|
| 1:1 mixture of ampicillin and dicloxacillin | 0.61 | 22.5 | 9.0 | 26 | 110 |
| 2:1 mixture of ampicillin and dicloxacillin | 0.64 | 40.5 | 35 | 26 | 95 |
| Dicloxacillin | 45 | 33.5 | >500 | >500 | >500 |
| Ampicillin | 1.4 | 75.5 | 19 | 19 | 95 |

PREPARATION OF DICLOXACILLIN

The following is a procedure for the preparation of sodium 6-[3-(2',6'-dichlorophenyl)-5-methyl-4-isoxazole-carboxamido]penicillanate monohydrate:

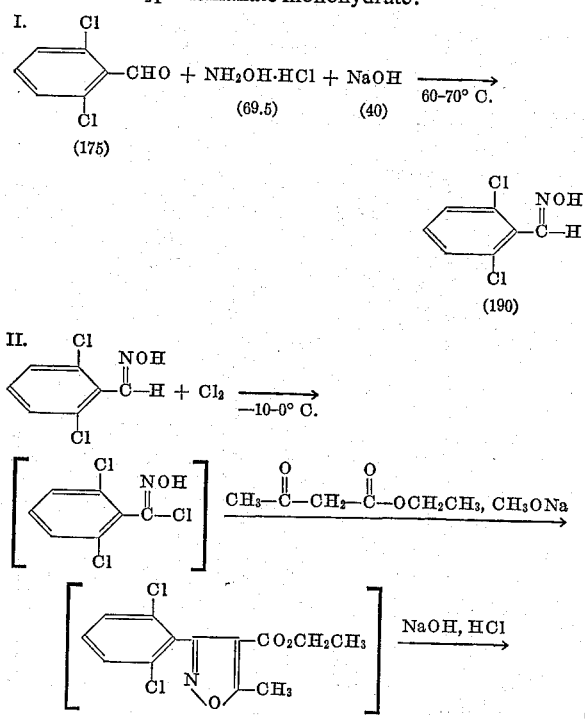

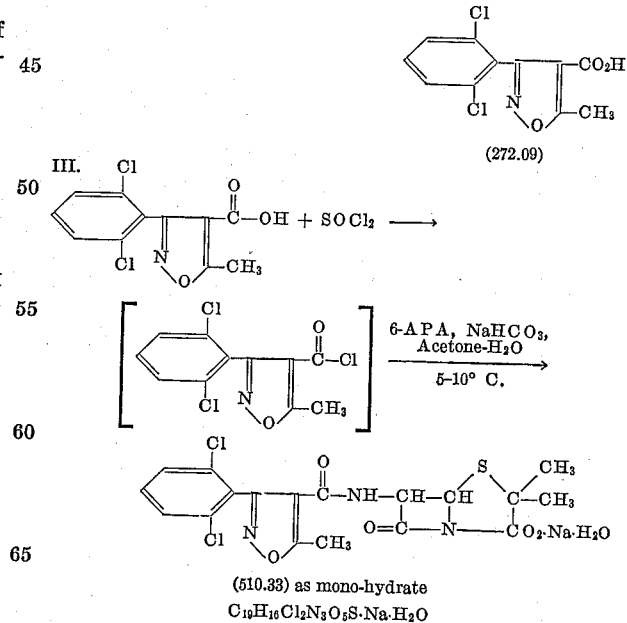

(510.33) as mono-hydrate
$C_{19}H_{16}Cl_2N_3O_5S \cdot Na \cdot H_2O$

*I. Procedure.*—A vigorously stirred slurry of 175 g. (1 mole) of 2,6-dichlorobenzaldehyde in 500 ml. of water was heated at 60° C.[1] while 40 g. (1 mole) of sodium hydroxide in 50 ml. of water was added rapidly followed by a solution of 69.5 g. (1 mole) of hydroxylamine hy- ---
[1] The aldehyde was stirred at 60° C. until all the aldehyde had melted. Higher temperatures may be used.

drochloride in 100 ml. of water added all at once. The temperature rose to 70° C. and the heat was then removed. One-half hour later the thick slurry was cooled, filtered, washed with water, air-dried and recrystallized from hot toluene to give 130 g.[2] of product. M.P. 147° C. (Ref. Beilstein, 7I134; Acad. Belg. [4], 21, 2221).

II. *Procedure.*—To 95 g. (0.5 mole) of the oxime suspended in 300 ml. of $CHCl_3$ at −10° C. was added with stirring[3], 36 g. (0.5 mole) of $Cl_2$ in 300 ml. of $CHCl_3$ in portions so as to not exceed 0° C. The stirred slurry was kept between 0° and 10° C. for one hour and at room temperature two hours. The pale blue solution was then evaporated under reduced pressure to an oil. The oil was then dissolved in 300 ml. of ice cold methanol and added to a previously prepared solution of 27 g. (0.5 mole) of sodium methoxide and 65 g. (0.5 mole) of ethyl acetoacetate in 300 ml. of methanol, later cooled to −10° C. After the addition, the slurry was allowed to reach room temperature and kept there for two hours. The slurry was then refluxed for one hour and the hot solution treated with 20 g. of NaOH in 100 ml. of water and refluxing continued for another hour. The methanol was then removed under reduced pressure and the residue shaken with 500 ml. of ether and 500 ml. of water. The aqueous phase was extracted with another 250 ml. portion of ether and the residual ether removed from the aqueous phase under reduced pressure. The aqueous phase was then cooled and acidified slowly with concentrated HCl to pH 2. The crystalline precipitate was collected by filtration, washed with water and air dried to give 25 g. (M.P. 220–223°). Concentration of the ether extracts gave a crystalline residue which was saponified in 500 ml. of methanol 20 g. of NaOH and 100 ml. of $H_2O$ for 12 hours. Worked up as before, there was obtained 50 g. of crude acid. After two recrystallizations from methanol-water there was obtained 36 g., M.P. 225–226° C.

*Analysis.*—Calc'd for C, 48.7; H, 2.59; N, 5.16. Found: C, 48.7; H, 2.63; N, 5.05.

III. *Procedure.*—Twenty-nine grams (0.103 mole) of acid from (II) was heated at 40–50° C. in 50 ml. of $SOCl_2$ for one hour. The excess $SOCl_2$ was removed under reduced pressure to leave an oil which crystallized immediately to a solid mass. The crude acid chloride was dissolved in 100 ml. of dry acetone and added dropwise over a 15-minute period to a rapidly stirred slurry of 21.6 g. (0.1 mole) of 6-aminopenicillanic acid (6-APA), 200 ml. $H_2O$, 100 ml. acetone and 35 g. $NaHCO_3$ at 10° C. The vigorously stirred slurry was kept at 10° C. for one hour and at 20° C. for one hour. The reaction mixture was then diluted with 500 ml. of water and extracted with 2 × 700 ml. portions of MIBK–ether (1:1). The aqueous phase was layered with 500 ml. MIBK (methyl isobutyl ketone) and cooled and stirred while slowly being acidified to pH 2 with 40% $H_3PO_4$. The MIBK extract was then washed with two 200 ml. portions of water, dried briefly over a mixture of sodium sulfate and magnesium sulfate, filtered, and treated with 50 ml. of 40% sodium 2-ethylhexanoate in n-butanol (NaEH). There was collected 30 g. of material which was acetone soluble. The 30 g. was dissolved in 200 ml. of acetone, filtered and scratched. There was collected 20 g. of acetone-washed product which had a different crystalline form than the original precipitate. This was recrystallized from butanol-$H_2O$ to give 8 g. of material (dec. 217° C.).

The experiment was repeated and the MIBK acid extract was treated as before with 50 ml. of 40% NaEH but this time seeded with the acetone-insoluble material. The yield was 37 g. (acetone washed and vacuum dried)

[2] The recrystallization results in los of product presumably due to the existence of syn and anti forms.
[3] A 10% excess of $Cl_2$ is probably more desirable than equimolar amounts.

of material identical in purity and spectra to the first run purified material. Yield was 72.6% of theory (dec. 218° C.).

(As monohydrate) *Analysis.*—Calc'd for: C, 44.75; H, 3.55; N, 8.25. Found: C, 44.75; H, 3.86; N, 8.42.

PREPARATION OF HETACILLIN

α-Aminobenzylpenicillin (8.4 g.; 0.023 mole) is dissolved in a mixture of water (100 ml.) and acetone (400 ml.) at a pH of 8.8 and at room temperature. This solution is then stirred at 36° C. for two hours during which time the pH drops to 7.9. The pH of the solution is adjusted to 7.0 and the acetone is removed in vacuo. The resultant pale yellow solution (100 ml.) is extracted with ether. The yellow color remains. The aqueous layer, which has a pH of 8.0, is filtered. The filtrate is then acidified by the addition of HCl. A cream-colored crystalline solid starts to separate at pH 4.5. This precipitate is still insoluble at pH 1.0. The pH is then adjusted to 2.0, the slurry is cooled for about one hour and filtered. The crystalline precipitate is washed with cold water and dried. The product (1.4 g.) is found to contain the β-lactam structure as shown by infrared analysis, to melt at 189.2–191.0° C. with decomposition, to be soluble in a pH 6.9 buffer, in methyl alcohol and in dimethylformamide and to be only slightly soluble in acetone. The product (the acetone derivative of α-aminobenzylpenicillin) is determined by bioassay to have an activity of 920 mcg./mg. versus α-aminobenzylpenicillin.

POTASSIUM SALT

To 100 gm. of α-aminobenzylpenicillin slurried in 2500 ml. of acetone is added 200 ml. of a 22% solution of potassium ethylhexanoate in dry n-butanol and the mixture is warmed to 45° C. whereupon the acid dissolves. After the mixture is agitated for one hour at 40–45 C., the product begins to crystallize out. Agitation is continued for four hours at 45° C. after which the product, the potassium salt of hetacillin, is collected by filtration, washed with 500 ml. of dry acetone, dried for 17 hours at 40° C. and found to weigh 70.0 grams.

*Analysis.*—Calc'd for $C_{19}H_{22}N_3SO_4K$: C, 53.4; H, 5.19; N, 9.83; K, 9.15. Found: C, 52.45; H, 5.12; N, 9.87; K, 7.95.

β-NAPHTHALENE SULFONATE

α-Aminobenzylpenicillin trihydrate (270 gm.) is slurried in 1350 ml. of acetone. Triethylamine (189 ml.) is added to the slurry which is then heated to 40° C. whereupon the acid is dissolved. The solution is stirred for five hours at 40–45° C., polish-filtered through filter aid and then slowly poured into 1500 ml. of water at 5° C., the pH of the water being maintained at 2.5 by intermittent addition of 6 N hydrochloric acid. After addition of all the rich acetone solution to the ice water, the resulting slurry (containing a crystalline precipitate) is stirred for one hour in an ice bath. The product, hetacillin, is then collected by filtration, washed with 500 ml. of cold water, dried for 17 hours at 40° C. and found to weigh 127.4 gms.

Sixty gms. of the hetacillin above is mixed in 1200 ml. of water at 20° C. To the resulting slurry is added 300 ml. of a 40% aqueous solution of β-naphthalene sulfonic acid. The slurry is stirred four hours at room temperature whereupon the product, the β-naphthalene sulfonic acid salt of hetacillin crystallizes out of solution as long needles, is collected by filtration, washed with 1200 ml. of cold water, dried for 20 hours at 40° C. and is found to weigh 76.5 grams.

*Analysis.*—Calc'd for $C_{29}H_{31}N_3S_2O_7$: C, 58.30; H, 5.23; N, 7.03; S, 10.70. Found: C, 57.70; H, 5.69; N, 7.73; S, 9.74.

HYDROCHLORIDE

*Part A.*—Three hundred grams of α-aminobenzylpenicillin trihydrate is mixed in 1500 ml. of acetone. Triethylamine (210 ml.) is added to the slurry which is then heated to and maintained at 30° C. for 20 hours. The solution is then polish-filtered through filter aid and the filter washed with 200 ml. acetone. The mixed filtrate and wash acetone is then added slowly to 1500 ml. ice water maintained at pH 2.5 by intermittent addition of 6 N hydrochloric acid. The resulting solution is stirred two hours at 0–10° C. while crystallization of hetacillin occurs. The crystalline product is then collected by filtration, washed on the filter with 600 ml. of ice water, dried and found to weigh 134.0 gms.

*Part B.*—120 gm. of the product of Part A above is slurried in 2200 ml. of water at 15° C. The slurry is agitated while 200 ml. concentrated hydrochloric acid is added and the solids dissolve. The strongly acidic solution is stirred for four hours at 27° C. during which time crystallization occurs. The crystalline product, the hydrochloric acid salt of hetacillin, is collected by filtration, quickly washed sequentially on the filter with 200 ml. of ice cold water and several portions of dry acetone, dried 18 hours at 40° C. and found to weight 75 gms.

*Analysis.*—Calc'd for $C_{19}H_{24}N_3SO_4Cl$: C, 53.8; H, 5.70; N, 9.89; Cl, 8.13. Found: C, 53.80; H, 5.78; N, 10.08; Cl, 8.25.

In the present invention and particularly in the examples, hetacillin free acid is taken as the standard with an activity of 1000 mcg./mgm. and when other salts are used, the weight taken is that which gives an equivalent amount of activity, i.e., 1096 mgms. of potassium hetacillin are equivalent in activity to 1000 mgms. of hetacillin free acid. The relationship is stoichiometric.

In the case of ampicillin the standard with an activity of 1000 mcg./mgm. is anhydrous ampicillin and thus ampicillin trihydrate has a potency of 865 mcg./mgm.

In the case of dicloxacillin, the standard is the free acid with an activity of 1000 mcg./mgm. and thus the sodium salt is 920 mcg./mgm.

In the actual formulations use is often made as is customary in this field of an overfill, e.g., of ten percent, of each active ingredient as compared to labelled potency.

The compositions of the present invention are of value in vitro, as in sterilizing laboratory glassware or the walls of hospital rooms as well as vivo in the treatment of bacterial infections in animals, including man.

The following examples are given to illustrate but not to limit the present invention.

EXAMPLE 1

*Ampicillin trihydrate with sodium dicloxacillin capsules (2:1)*

(1) Preparation of Mixture A

| | Gm. per capsule |
|---|---|
| Sodium dicloxacillin, 200-mesh powder (activity) | 0.1375 |
| Magnesium stearate | 0.00408 |

Place the two powders in a blender and mix for ten minutes. Compact the mixture. In a mill reduce the above to give 40–60-mesh granules.

(2) Preparation of Mixture B

| | Gm. per capsule |
|---|---|
| Ampicillin trihydrate, 200-mesh (activity) | 0.275 |
| Magnesium stearate | 0.00408 |

Place the two powders in a blender and mix for 10 minutes. Compact the mixture. In a mill reduce the above to give 40–60 mesh granules.

(3) Preparation of final product

| | Gm. per capsule |
|---|---|
| Mixture A | 0.14158 |
| Mixture B | 0.27908 |
| "Syloid" (micron-sized silica gel) | 0.0016 |
| Lactose. | |

In a blender mix the granules of mixtures A and B with Syloid. Fill into No. 1 capsules. Adjust fill with lactose. Each capsule represents 0.125 gm. of dicloxacillin activity and 0.250 gm. of ampicillin activity.

EXAMPLE 2

*Ampicillin trihydrate with sodium dicloxacillin capsule (1:1)*

(1) Preparation of Mixture A

| | Gm. per capsule |
|---|---|
| Sodium dicloxacillin, 200-mesh powder (activity) | 0.275 |
| Magnesium stearate | 0.00408 |

Place the two powders in a blender and mix for 10 minutes. Compact the mixture. In a mill reduce the above to give 40–60 mesh granules.

(2) Preparation of Mixture B

| | Gm. per capsule |
|---|---|
| Ampicillin trihydrate, 200-mesh (activity) | 0.275 |
| Magnesium stearate | 0.00408 |

Place the two powders in a blender and mix for 10 minutes. Compact the mixture. In a mill reduce the above to give 40–60 mesh granules.

(3) Preparation of final product

| | Gm. per capsule |
|---|---|
| Mixture A | 0.27908 |
| Mixture B | 0.27908 |
| "Syloid" | 0.0016 |
| Lactose. | |

In a blender mix the granules of mixtures A and B with 'Syloid." Fill into No. 0 capsules. Adjust fill with lactose. Each capsule represents 0.250 gm. of dicloxacillin activity and 0.250 gm. of ampicillin activity.

EXAMPLE 3

*Sodium dicloxacillin with sodium ampicillin powder; single dose intramuscular injection*

| | Gm. per vial |
|---|---|
| Sodium dicloxacillin, 200-mesh powder (activity) | 0.1375 |
| Sodium ampicillin, 200-mesh powder (activity) | 0.275 |

(1) Mix the two powders.
(2) Fill into vials.
(3) Each vial represents 0.125 gm. dicloxacillin activity and 0.250 gm. of ampicillin activity.
(4) Prior to use add sufficient water for injection to give 1.5 ml. of solution.

EXAMPLE 4

*Sodium dicloxacillin with sodium ampicillin powder; single dose for instramuscular injection*

| | Gm. per vial |
|---|---|
| Sodium dicloxacillin, 200- mesh powder (activity) | 0.275 |
| Sodium ampicillin, 200-mesh powder (activity) | 0.275 |

(1) Mix the two powders.
(2) Fill into vials.
(3) Each vial represents 0.250 gm. dicloxacillin activity and 0.250 gm. of ampicillin activity.
(4) Prior to use add sufficient water for injection to make 1.5 ml. of solution.

Example 5

*Sodium dicloxacillin with ampicillin trihydrate; powder for intramuscular injection*

| | Gm. per vial |
|---|---|
| Sodium dicloxacillin, 200-mesh powder (activity) | 0.1375 |
| Ampicillin trihydrate, micronized powder (activity) | 0.275 |

(1) Mix the two powders.
(2) Fill into vials.
(3) Each vial represents 0.125 gm. dicloxacillin activity and 0.250 gm. ampicillin activity.
(4) Prior to use add sufficient water for injection to make 1.0 ml. of suspension.

Example 6

*Sodium dicloxacillin with ampicillin trihydrate; powder for intramuscular injection*

| | Gm. per vial |
|---|---|
| Sodium dicloxacillin, 200-mesh powder (activity) | 0.275 |
| Ampicillin trihydrate, micronized powder (activity) | 0.275 |

(1) Mix the two powders.
(2) Fill into vials.
(3) Each vial represents 0.250 gm. dicloxacillin activity and 0.250 gm. ampicillin activity.
(4) Prior to use add sufficient water for injection to make 1.0 ml. of suspension.

Example 7

*Sodium dicloxacillin with ampicillin trihydrate; granules for oral suspension*

| | Per 60 ml. |
|---|---|
| Sodium dicloxacillin, 200-mesh powder (activity) gm | 1.65 |
| Ampicillin trihydrate, micronized powder (activity) gm | 1.65 |
| Sodium saccharin gm | 0.30 |
| Sodium sucaryl gm | 1.80 |
| Sodium citrate, anhydrous gm | 0.14 |
| Sodium benzoate gm | 0.06 |
| Acacia gm | 1.50 |
| Tween 40 ml | 0.06 |
| FD & C red 2 1% trituration gm | 0.60 |
| Sodium chloride U.S.P. gm | 0.60 |
| Flavor ml | 0.025 |
| Vanillin gm | 0.005 |
| Sucrose 60-mesh granules gm | 23.406 |

(1) Mix the tween 40 and the liquid flavors with 50% of the sucaryl. Pass through a 60-mesh screen.
(2) Add all the other ingredients except the sucrose and blend well.
(3) Compact the mixture.
(4) Using a mill, reduce the above to 60–100-mesh granules.
(5) Blend the granules and the sucrose.
(6) Fill into two ounce bottles.
(7) Prior to use, add sufficient deionized water to make 60 ml. of suspension. Each five milliliters of the resulting suspension represents 0.125 gm. of dicloxacillin activity and 0.125 gm. of ampicillin activity.

Example 8

*Sodium dicloxacillin with ampicillin trihydrate; granules for oral suspension*

| | Per 60 ml. |
|---|---|
| Sodium dicloxacillin, 200-mesh powder (activity) | 0.825 |
| Ampicillin trihydrate, micronized powder (activity) | 1.65 |
| Sodium saccharin gm | 0.30 |
| Sodium sucaryl gm | 1.80 |
| Sodium citrate, anhydrous gm | 0.14 |
| Sodium chloride gm | 0.60 |
| Acacia gm | 1.5 |
| FD & C Red 2 1% trituration gm | 0.14 |
| Vanillin gm | 0.005 |
| Flavor ml | 0.075 |
| Tween 40 ml | 0.06 |
| Sucrose 60-mesh granules gm | 29.86 |

(1) Mix the tween 40 and the liquid flavor with 50% of the sucaryl. Pass through a 60-mesh screen.
(2) Add all the other ingredients, except the sucrose and blend.
(3) Compact the mixture.
(4) Using a mill, reduce the above to 60–100-mesh granules.
(5) Blend the granules and the sucrose.
(6) Fill into two-ounce bottles.
(7) Prior to use, add sufficient deionized water to make 60 ml. of suspension. Each five milliliter of the resulting suspension represents 0.0625 gm. of dicloxacillin activity and 0.125 gm. of ampicillin activity.

Example 9

*Hetacillin (250 mg.) with sodium dicloxacillin (250 mg.); capsules*

Ingredients:

| | Gram per capsule |
|---|---|
| Hetacillin, 200-mesh powder, free acid form (activity) | 0.275 |
| Sodium dicloxacillin, 200-mesh powder (activity) | 0.275 |
| Magnesium stearate to compact | 0.011 |
| Magnesium stearate to encapsulate | 0.011 |

(1) Mix the hetacillin, sodium dicloxacillin and magnesium stearate for compaction in a blender.
(2) Compact.
(3) Reduce to 30-mesh granules in a mill.
(4) Add magnesium stearate for encapsulation to the granules and blend in blender.
(5) Fill into No. 0 hard gelatin capsules. The average dosage in man is one capsule q.i.d.

Example 10

*Hetacillin (250 mg.) with sodium dicloxacillin (125 mg.); capsules*

Ingredients:

| | Gram per capsule |
|---|---|
| Hetacillin, 200-mesh powder, free acid form (activity) | 0.275 |
| Sodium dicloxacillin, 200 mesh powder (activity) | 0.1375 |
| Magnesium stearate for compaction | 0.008 |
| Magnesium stearate for encapsulation | 0.008 |

(1) Mix the hetacillin, sodium dicloxacillin and magnesium stearate for compaction in a blender.
(2) Compact.
(3) Reduce to 30-mesh granules in a mill.
(4) Add magnesium stearate for encapsulation to the granules and blend in a blender.
(5) Fill into No. 1 hard gelatin capsules. The average dosage in man is one capsule q.i.d.

Example 11

*Hetacillin (250 mg.) with sodium dicloxacillin (250 mg.); powder for single dose intramuscular suspension*

Ingredients:

| | Gram per vial |
|---|---|
| Hetacillin, 200-mesh powder, free acid form (activity) | 0.275 |
| Sodium dicloxacillin, 200-mesh powder (activity) | 0.275 |

(1) Blend the two powders.
(2) Fill into 8.2 ml. vials.

(3) Prior to use, add 1.6 ml. of water for injection to give 2.0 ml. of suspension.
(4) Each vial represents 250 mg. of hetacillin activity and 250 mg. of dicloxacillin activity.

EXAMPLE 12

*Hetacillin (250 mg.) with sodium dicloxacillin (125 mg.); powder for single dose intramuscular suspension*

Ingredients: Gram per vial
Hetacillin, 200-mesh powder, free acid form (activity) _____ 0.275
Sodium dicloxacillin, 200-mesh powder (activity) _____ 0.1375

(1) Blend the two powders.
(2) Fill into 8.2 ml. vials.
(3) Each vial represents 250 mg. of hetacillin activity and 125 mg. of dicloxacillin activity.
(4) Prior to use, add 0.8 ml. of water for injection to give 1.0 ml. of suspension.

EXAMPLE 13

*Potassium hetacillin (250 mg.) with sodium-dicloxacillin (250 mg.); powder for single dose intramuscular solution*

Ingredients: Gram per vial
Potassium hetacillin, 200-mesh powder activity) _____ 0.275
Sodium dicloxacillin, 200-mesh powder (activity) _____ 0.275

(1) Blend the two powders.
(2) Fill into 8.2 ml. vials.
(3) Each vial represents 250 mg. hetacillin activity and 250 mg. of dicloxacillin activity.
(4) Prior to use, add 1.2 ml. of water for injection to give 1.5 ml. solution.

EXAMPLE 14

*Potassium hetacillin (250 mg.) with sodium dicloxacillin (125 mg.); powder for single dose intramuscular solution*

Ingredients: Gram per vial
Potassium hetacillin, 200-mesh powder activity) _____ 0.275
Sodium dicloxacillin, 200-mesh powder (activity) _____ 0.1375

(1) Blend the two powders.
(2) Fill into 8.2 ml. vials.
(3) Each vial represents 250 mg. hetacillin activity and 125 mg. dicloxacillin activity.
(4) Prior to use, add 0.8 ml. of water for injection to give 1.0 ml. solution.

EXAMPLE 15

*Hetacillin (125 mg.) with sodium dicloxacillin (62.5 mg.) per 5 ml.; granules for oral suspension*

Ingredients: Grams per 60 ml.
Hetacillin, micronized, free acid form (activity) _____ 1.65
Sodium dicloxacillin, 200-mesh (activity) __ 0.825
Sodium saccharin _____ 0.30
Sodium cylamate _____ 1.8
Sodium benzoate _____ 0.06
Acacia _____ 1.5
Sodium citrate _____ 0.12
Citric acid _____ 0.0215
FD & C yellow 6 _____ 0.005
Flavor, powdered _____ 0.6
Sucrose, 60–80-mesh _____ 30.0

(1) Blend all ingredients except the sucrose.
(2) Compact.
(3) Reduce to 60–100-mesh granules in a mill (greater than 65% granules).
(4) Mix the above with the sucrose.
(5) Fill into 60 ml. flint bottles.
(6) Prior to use add sufficient deionized water to make 60 ml. of suspension. Each five ml. of resulting suspension contains 125 mg. hetacillin activity and 62.5 mg. of dicloxacillin activity. The pH of this suspension is about 4.5.

EXAMPLE 16

*Hetacillin (125 mg.) with sodium dicloxacillin (62.5 mg.) per 5 ml.; granules for oral suspension*

Ingredients: Grams per 60 ml.
Hetacillin, micronized, free acid form (activity) _____ 1.65
Sodium dicloxacillin, 200-mesh (activity) ___ 0.825
Sodium saccharin _____ 0.30
Sodium cyclamate _____ 1.8
Sodium benzoate _____ 0.06
Acacia _____ 1.5
Citric acid _____ 0.27
FD & C yellow 6 _____ 0.005
Flavor, powdered _____ 0.6
Sucrose, 60–80-mesh _____ 30

(1) Blend all ingredients except the sucrose.
(2) Compact.
(3) Reduce to 60–100-mesh granules in a mill (greater than 65% granules).
(4) Mix the above with the sucrose.
(5) Fill into 60 ml. flint bottles.
(6) Prior to use add sufficient deionized water to make 60 ml. of suspension. Each five ml. of resulting suspension contains 125 mg. hetacillin activity and 62.5 mg. of dicloxacillin activity. The pH of this suspension is about 3.7.

EXAMPLE 17

*Hectacillin (125 mg.) with sodium dicloxacillin (62.5 mg.) per 5 ml.; granules for oral suspension*

Ingredients: Grams per 60 ml.
Hectacillin, micronized, free acid form (activity) _____ 1.65
Sodium dicloxacillin, 200 mesh (activity) ___ 0.825
Sodium saccharin _____ 0.30
Sodium cyclamate _____ 1.8
Sodium benzoate _____ 0.06
Acacia _____ 1.5
Kelmar _____ 0.1
Citric acid _____ 0.27
FD & C yellow 6 _____ 0.005
Flavor, powdered _____ 0.6
Sucrose, 60–80 mesh _____ 30.0

(1) Blend all ingredients except the sucrose.
(2) Compact.
(3) Reduce to 60–100-mesh granules in a mill (greater than 65% granules).
(4) Mix the above with the sucrose.
(5) Fill into 60 ml. flint bottles.
(6) Prior to use add sufficient deionized water to make 60 ml. of suspension. Each five ml. of resulting suspension contains 125 mg. hetacillin activity and 62.5 mg. of dicloxacillin activity. The pH of this suspension is about 3.7.

EXAMPLE 18

*Hetacillin (125 mg.) with sodium dicloxacillin (125 mg.) per 5 ml.; granules for oral suspension*

Ingredients: Grams per 60 ml.
Hetacillin, micronized, free acid form (activity) _____ 1.65
Sodium dicloxacillin, 200-mesh (activity) ____ 1.65
Sodium saccharin _____ 0.3
Sodium cyclamate _____ 1.8
Sodium benzoate _____ 0.06
Acacia _____ 1.5
FD & C red 2, 1% trituration _____ 0.14
Flavor, powdered _____ 1.60
Sucrose, 60–80-mesh _____ 30

(1) Blend all ingredients except the sucrose.
(2) Compact.
(3) Reduce to 60–100-mesh granules in a mill (greater than 65% granules).
(4) Mix the above with the sucrose.
(5) Fill into 60 ml. flint bottles.
(6) Prior to use add sufficient deionized water to make 60 ml. of suspension. Each five ml. of resulting suspension contains 125 mg. hetacillin activity and 125 mg. of dicloxacillin activity. The pH of this suspension is about 5.0.

EXAMPLE 19

*Hetacillin (125 mg.) with sodium dicloxacillin (125 mg.) per 5 ml.; granules for oral suspension*

Ingredients: Grams per 60 ml.

| | |
|---|---|
| Hetacillin, micronized, free acid form (activity) | 1.65 |
| Sodium dicloxacillin, 200-mesh (activity) | 1.65 |
| Sodium saccharin | 0.3 |
| Sodium cyclamate | 1.8 |
| Sodium benzoate | 0.06 |
| Acacia | 1.5 |
| Citric acid | 0.04 |
| FD & C yellow 6 | 0.05 |
| Flavor, powdered | 0.3 |
| Sucrose, 60–80-mesh | 30 |

(1) Blend all ingredients except the sucrose.
(2) Compact.
(3) Reduce to 60–100-mesh granules in a mill (greater than 65% granules).
(4) Mix the above with the sucrose.
(5) Fill into 60 ml. flint bottles.
(6) Prior to use add sufficient deionized water to make 60 ml. of suspension. Each 5 ml. of resulting suspension contains 125 mg. hetacillin activity and 125 mg. of dicloxacillin activity. The pH of this suspension is about 4.5.

EXAMPLE 20

*Hetacillin (125 mg.) with sodium dicloxacillin (125 mg.) per 5 ml.; granules for oral suspension*

Ingredients: Grams per 60 ml.

| | |
|---|---|
| Hetacillin, micronized, free acid form (activity) | 1.65 |
| Sodium dicloxacillin, 200-mesh (activity) | 1.65 |
| Sodium saccharin | 0.3 |
| Sodium cyclamate | 1.8 |
| Sodium benzoate | 0.06 |
| Acacia | 1.5 |
| Citric acid | 0.46 |
| FD & C yellow 6 | 0.05 |
| Flavor, powdered | 0.3 |
| Sucrose, 60–80-mesh | 30 |

(1) Blend all ingredients except the sucrose.
(2) Compact.
(3) Reduce to 60–100-mesh granules in a mill (greater than 65% granules).
(4) Blend the above with the sucrose.
(5) Fill into 60 ml. flint bottles.
(6) Prior to use add sufficient deionized water to make 60 ml. of suspension. Each 5 ml. of resulting suspension contains 125 mg. of dicloxacillin activity. The pH of this suspension is about 3.7.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:
1. An antibacterial composition comprising a mixture of about one to about two parts by weight of a member selected from the group consisting of hetacillin and ampicillin with one part by weight of dicloxacillin.
2. A therapeutic composition in unit dosage form comprising a mixture of about 125 to 250 mgm. per unit dose of dicloxacillin with about 250 mgm. per unit dose of a member selected from the group consisting of ampicillin and hetacillin.
3. An antibacterial composition comprising a mixture of about one to about two parts by weight of hetacillin with one part by weight of dicloxacillin.
4. A therapeutic composition in unit dosage form comprising a mixture of about 125 to 250 mgm. per unit dose of dicloxacillin with about 250 mgm. per unit dose of hetacillin.
5. An antibacterial composition comprising a mixture of about one to about two parts by weight of ampicillin with one part by weight of dicloxacillin.
6. A therapeutic composition in unit dosage form comprising a mixture of about 125 to 250 mgm. per unit dose of dicloxacillin with about 250 mgm. per unit dose of ampicillin.
7. The method of inhibiting the growth of bacteria which comprises applying to the habitat of the bacteria an effective amount of an antibacterial composition comprising a mixture of about one to about two parts by weight of a member selected from the group consisting of hetacillin and ampicillin with one part by weight of dicloxacillin.
8. The method of inhibiting the growth of bacteria which comprises applying to the habitat of the bacteria an effective amount of an antibacterial composition comprising a mixture of about one to about two parts by weight of hetacillin with one part by weight of dicloxacillin.
9. The method of inhibiting the growth of bacteria which comprises applying to the habitat of the bacteria an effective amount of an antibacterial composition comprising a mixture of about one to about two parts by weight of ampicillin with one part by weight of dicloxacillin.
10. The process for treating a bacterial disease in animals which comprises administering to the bacterial host a therapeutic amount of an antibacterial composition comprising a mixture of about one to about two parts by weight of a member selected from the group consisting of hetacillin and ampicillin with one part by weight of dicloxacillin.
11. The process for treating a bacterial disease in animals which comprises administering to the bacterial host a therapeutic amount of an antibacterial composition comprising a mixture of about one to about two parts by weight of hetacillin with one part by weight of dicloxacillin.
12. The process for treating a bacterial disease in animals which comprises administering to the bacterial host a therapeutic amount of an antibacterial composition comprising a mixture of about one to about two parts by weight of ampicillin with one part by weight of dicloxacillin.

References Cited by the Applicant

UNITED STATES PATENTS

| | | |
|---|---|---|
| 2,985,648 | 5/1961 | Doyle et al. |
| 2,996,501 | 8/1961 | Doyle et al. |
| 3,198,804 | 8/1965 | Johnson et al. |

ALBERT T. MEYERS, *Primary Examiner.*

JEROME D. GOLDBERG, *Examiner.*